US008540603B2

(12) United States Patent
Kobayashi et al.

(10) Patent No.: US 8,540,603 B2
(45) Date of Patent: Sep. 24, 2013

(54) VEHICLE POWER TRANSMISSION CONTROL DEVICE

(75) Inventors: Kazutaka Kobayashi, Nishio (JP); Yuichiro Nakamura, Obu (JP)

(73) Assignees: Aisin AI Co., Ltd., Nishio-Shi (JP); Aisin Seiki Kabushiki Kaisha, Kariya-Shi (JP)

( * ) Notice: Subject to any disclaimer, the term of this patent is extended or adjusted under 35 U.S.C. 154(b) by 0 days.

(21) Appl. No.: 13/809,958

(22) PCT Filed: Jul. 5, 2011

(86) PCT No.: PCT/JP2011/065355
§ 371 (c)(1),
(2), (4) Date: Feb. 4, 2013

(87) PCT Pub. No.: WO2012/008332
PCT Pub. Date: Jan. 19, 2012

(65) Prior Publication Data
US 2013/0150207 A1    Jun. 13, 2013

(30) Foreign Application Priority Data
Jul. 13, 2010  (JP) .................... 2010-158715

(51) Int. Cl.
*B60W 10/08*    (2006.01)
(52) U.S. Cl.
USPC ................................. 477/5; 477/77
(58) Field of Classification Search
None
See application file for complete search history.

(56) References Cited

U.S. PATENT DOCUMENTS 6,319,168 B1 * 11/2001 Morris et al. ............... 477/5
2007/0106447 A1   5/2007 Ogawa

FOREIGN PATENT DOCUMENTS

| EP | 1 640 234 A1 | 3/2006 |
|---|---|---|
| JP | 2000-224710 A1 | 8/2000 |
| JP | 2005-151699 A1 | 6/2005 |
| JP | 2005-325967 A1 | 11/2005 |
| JP | 2006-097740 A1 | 4/2006 |
| JP | 2006-207520 A1 | 8/2006 |
| JP | 2007-131038 A1 | 5/2007 |
| WO | 99/21263 A2 | 4/1999 |

OTHER PUBLICATIONS

International Search Report and Written Opinion dated Oct. 11, 2011.

* cited by examiner

*Primary Examiner* — Erin D Bishop
(74) *Attorney, Agent, or Firm* — Burr & Brown

(57) ABSTRACT

In a state in which a vehicle travels while an internal-combustion-engine driving torque (Te) is transmitted to drive wheels, the internal-combustion-engine driving torque (Te) and a clutch torque (Tc) are decreased and an electric-motor driving torque (Tm) is increased based on the satisfaction of a shift-up condition (t1). During the time period from the satisfaction of the shift-up condition to time at which the clutch torque (Tc) becomes zero (t1 to t2), a load torque (Ts) of a power generator rotationally driven by an output shaft of the internal combustion engine is generated. In a hybrid vehicle equipped with an AMT, power consumption with the driving of an electric motor when a shift-up action is carried out using the assist of the electric-motor torque can be reduced.

5 Claims, 5 Drawing Sheets

VEHICLE POWER TRANSMISSION CONTROL DEVICE

TECHNICAL FIELD

The present invention relates to a power transmission control device for a vehicle, and more particularly, to a power transmission control device applied to a vehicle provided with an internal combustion engine and an electric motor as power sources, and also provided with a clutch.

BACKGROUND ART

In recent years, a power transmission control device including a stepped transmission having a plurality of gear positions and not having a torque converter, a clutch interposed between an output shaft of an internal combustion engine and an input shaft of the stepped transmission and capable of adjusting a clutch torque (the maximum value of the torque which can be transmitted by the clutch), and control means for controlling, by using actuators, the clutch torque and a gear position of the stepped transmission depending on a travel state of a vehicle has been developed (for example, see Patent Literature 1). This power transmission control device is also referred to as automated manual transmission (AMT).

In a vehicle equipped with the AMT, when a gear change action (action for changing a gear position of the transmission) is to be carried out, a state of the clutch is changed from an engaged state (clutch torque>0) to a disengaged state (clutch torque=0) before the start of the gear change action. While the clutch is maintained in the disengaged state, the gear change action is carried out. After the gear change action is finished, the clutch is returned from the disengaged state to the engaged state.

Further, in recent years, a so-called hybrid vehicle provided with an engine and an electric motor (an electric motor and an electric power generator) as power sources has been developed (for example, see Patent Literature 2). The hybrid vehicle may employ a configuration in which an output shaft of the electric motor is connected to any one of an output shaft of the internal combustion engine, an input shaft of the transmission, and an output shaft of the transmission. In the following description, a driving torque of the output shaft of the internal combustion engine is referred to as "internal-combustion-engine driving torque," and a driving torque of the output shaft of the electric motor is referred to as "electric-motor driving torque."

CITATION LIST

Patent Literature

[PTL 1] JP 2006-97740 A
[PTL 2] JP 2000-224710 A

SUMMARY OF INVENTION

Technical Problem

A hybrid vehicle (hereinafter referred to as "hybrid vehicle with an AMT") having a configuration in which the AMT is mounted and the output shaft of the electric motor is connected to the output shaft of the transmission is assumed. In the hybrid vehicle with the AMT, during the gear change action (that is, while the internal-combustion-engine driving torque cannot be transmitted to the output shaft of the transmission due to the disengagement of the clutch or the like), the electric-motor driving torque can be transmitted to the output shaft of the transmission (thus, to drive wheels). By using the assist of the electric-motor driving torque in the above-mentioned manner, a gear change shock (generation of a valley in the driving torque) produced along with the gear change action can be suppressed.

More specific description is given of an action carried out in the case where a shift-up action (gear change action for changing the gear position to a higher speed side) by using the assist of the electric-motor driving torque while the vehicle is traveling using the internal-combustion-engine driving torque (when the internal-combustion-engine driving torque is transmitted to the drive wheels). In this case, before the start of the shift-up action, the clutch torque is generally adjusted to a value larger than the internal-combustion-engine driving torque so that a slip does not occur in the clutch.

When a condition for carrying out the shift-up action is satisfied in the state described above, the internal-combustion-engine driving torque and the clutch torque are first decreased, and the electric-motor driving torque is increased. Thereafter, when the clutch torque becomes zero, the shift-up action is carried out while the clutch torque is maintained to zero and a state in which the electric-motor driving torque is transmitted to the drive wheels (specifically, a state in which the assist of the electric-motor driving torque is used) is maintained. Thereafter, when the shift-up action is finished, the internal-combustion-engine driving torque and the clutch torque are increased, and the electric-motor driving torque is decreased.

As described above, in the case where the shift-up action is carried out with the use of the assist of the electric-motor driving torque, electric power is consumed so as to temporarily increase the electric-motor driving torque. The electric power consumption decreases as a time period in which the electric-motor driving torque is increased becomes shorter. Therefore, in view of the reduction in electric power consumption, it is preferred that the time period in which the electric-motor driving torque is increased be as short as possible.

Solution to Problem

It is an object of the present invention to provide a power transmission control device for a vehicle, which is applied to a hybrid vehicle with an AMT, whose electric power consumption with the driving of an electric motor when a shift-up action is carried out by using the assist of an electric-motor driving torque is small.

The power transmission control device for a vehicle according to the present invention is applied to a hybrid vehicle including an internal combustion engine and an electric motor as power sources. The power transmission control device includes a stepped transmission (T/M), a clutch (C/D), and control means (ECU, AC/D1, and AC/D2).

The stepped transmission includes an input shaft (A2) to which power is input from an output shaft (A1) of the internal combustion engine, and an output shaft (A3) for outputting power to drive wheels of the vehicle. The stepped transmission includes a plurality of predetermined gear positions having different speed reduction ratios (ratio of an rpm (Ni) of the input shaft to an rpm (No) of the output shaft), and does not include a torque converter. The power is input from the output shaft of the electric motor to the output shaft of the stepped transmission without intermediation of the stepped transmission.

The clutch is interposed between the output shaft of the internal combustion engine and the input shaft of the stepped transmission so that a clutch torque (maximum value of a torque which can be transmitted by the clutch) is adjustable.

The control means controls the internal-combustion-engine driving torque (Te), the electric-motor driving torque (Tm), the clutch torque (Tc) of the clutch, and the gear position of the stepped transmission based on a travel state of the vehicle. Specifically, the power transmission control device is applied to the above-mentioned "hybrid vehicle with an AMT".

The control means decreases the internal-combustion-engine driving torque and the clutch torque and increases the electric-motor driving torque based on the satisfaction of a shift-up condition for changing the gear position of the stepped transmission from a current gear position to a high-speed side gear position having a smaller speed reduction ratio than that of the current gear position in a state in which the clutch torque is adjusted to a value larger than the internal-combustion-engine driving torque and the vehicle travels while the internal-combustion-engine driving torque is transmitted to the drive wheels. Thereafter, based on the fact that the clutch torque becomes zero, the control means performs a gear change action for changing the gear position of the stepped transmission from the current gear position to the high-speed side gear position while the clutch torque is maintained to zero and a state in which the electric-motor driving torque is transmitted to the drive wheels is maintained. Thereafter, based on the termination of the gear change action, the control means increases the internal-combustion-engine driving torque and the clutch torque and decreases the electric-motor driving torque. Specifically, the power transmission control device performs a shift-up action by using the assist of the electric-motor driving torque. The "state in which the vehicle travels while the internal-combustion-engine driving torque is transmitted to the drive wheels" includes a state in which the vehicle travels while only the internal-combustion-engine driving torque (>0) is transmitted to the drive wheels and a state in which the vehicle travels while the internal-combustion-engine driving torque (>0) and the electric-motor driving torque (>0) are both transmitted to the drive wheels.

Here, during a time period from the satisfaction of the shift-up condition to time at which the clutch torque becomes zero (specifically, time at which the clutch is brought into a disengaged state) (hereinafter referred to as "clutch-torque decrease time period"), the internal-combustion-engine driving torque and the clutch torque are required to be decreased while a state in which the clutch torque is larger than the internal-combustion-engine driving torque is maintained. As a result, the occurrence of a slide in the clutch can be suppressed during the clutch-torque decrease time period.

The power transmission control device has a feature that the control means is configured so as to adjust a load torque (Ts, a torque in a deceleration direction) of a power generator provided to the vehicle, which is rotationally driven by the output shaft of the internal combustion engine, to a value larger than that before the satisfaction of the shift-up condition, during the clutch-torque decrease time period. As the power generator, for example, an alternator (AC generator) having a function of generating electric power based on the internal-combustion-engine driving torque can be used. Further, a starter motor/generator having a function of rotationally driving the output shaft of the internal combustion engine to start the internal combustion engine and the function of the alternator can also be used. Further, it is also possible to use a second electric motor (different from the electric motor described above and have a function of generating a driving torque and a function of generating a regenerative torque), which is provided to the vehicle as a power source for the vehicle and includes an output shaft from which the power is input to the output shaft of the internal combustion engine.

The load torque of the power generator acts in a direction of decreasing a net internal-combustion-engine driving torque (Tne=Te+Ts). Therefore, when the load torque of the power generator is increased during the clutch-torque decrease time period, a gradient of decrease of the net internal-combustion-engine driving torque during the clutch-torque decrease time period can be increased as compared with the case where the load torque of the power generator is not increased. As a result, the gradient of decrease of the clutch torque during the clutch-torque decrease time period can be increased, and hence the timing at which the clutch torque becomes zero can be advanced. In other words, the clutch-torque decrease time period can be shortened.

Here, as described above, the electric-motor driving torque is increased during the clutch-torque decrease time period. Specifically, as the clutch-torque decrease time period becomes shorter, the electric power consumed with the driving of the electric motor during the clutch-torque decrease time period is more reduced. As described above, according to the above-mentioned configuration, the power consumption with the driving of the electric motor when the shift-up action is carried out by using the assist of the electric-motor driving torque can be decreased as compared with the case where the load torque of the power generator is not increased. In addition, by increasing the load torque of the power generator, the amount of power generated by the power generator is increased. The increased amount of electric power as described above can be efficiently used for various types of electric equipment mounted on the vehicle.

DESCRIPTION OF EMBODIMENT

Figure 1:
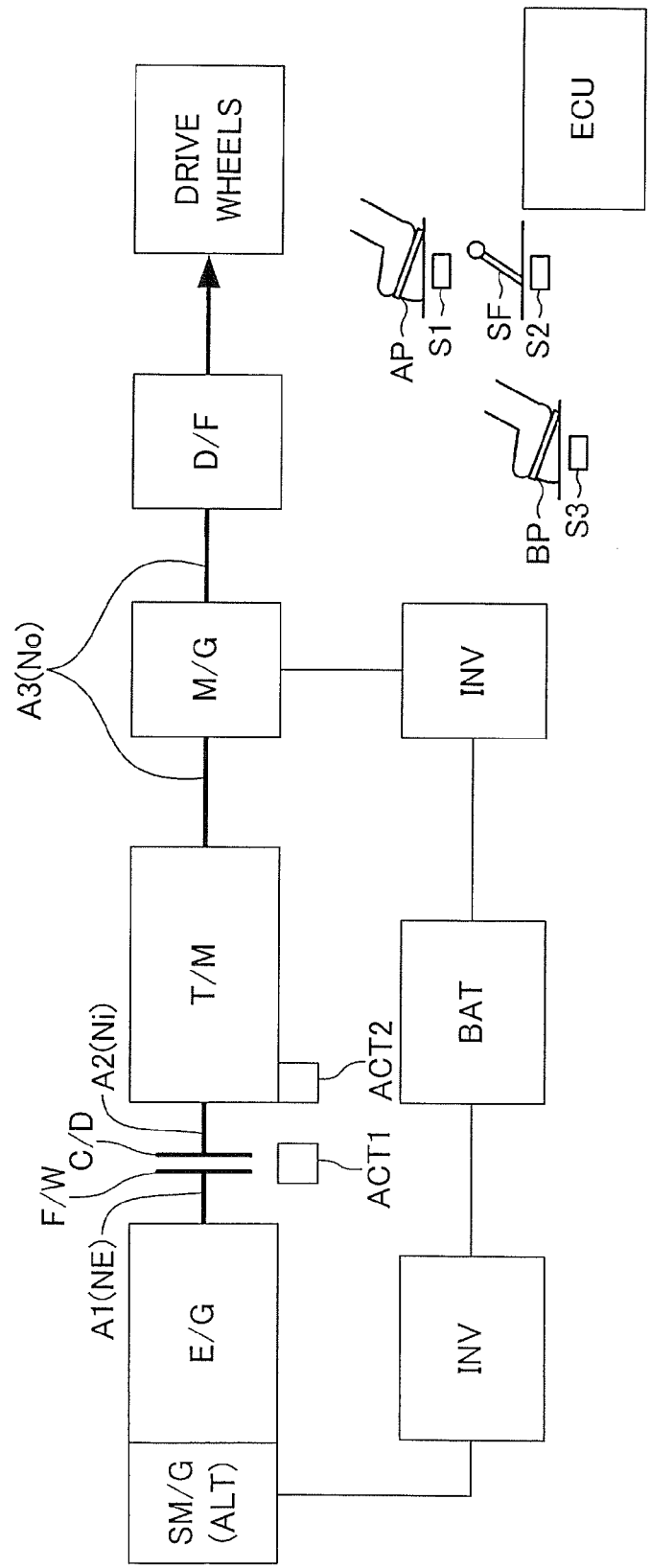
FIG. 1 A schematic configuration diagram of a vehicle equipped with a power transmission control device for a vehicle according to an embodiment of the present invention.

Referring to the drawings, a description is now given of an embodiment of a power transmission control device for a vehicle according to the present invention.

(Configuration)

FIG. 1 illustrates a schematic configuration of a vehicle equipped with a power transmission control device (hereinafter referred to as "this device") according to an embodiment of the present invention. This vehicle is a hybrid vehicle provided with an internal combustion engine and a motor/generator as power sources, and also provided with a so-called automated manual transmission (AMT) using a clutch and a stepped transmission without a torque converter.

This vehicle is provided with an engine E/G, a transmission T/M, a clutch C/D, and a motor/generator M/G. The E/G is one of well-known internal combustion engines, and is, for example, a gasoline engine using gasoline as a fuel or a diesel engine using light oil as a fuel.

An output shaft A1 of the engine E/G is rotationally driven by a starter motor/generator (hereinafter referred to as "starter generator") SM/G which receives the supply of electric power from a battery BAT. The starter generator SM/G is used to start the engine E/G whose operation is currently stopped. The starter generator SM/G is rotationally driven by the output shaft A1 of the E/G so as to also function as a power generator which applies a load torque to the output shaft A1 of the E/G. The output shaft A1 of the E/G is connected, via a flywheel FAN and the clutch C/D, to an input shaft A2 of the transmission T/M.

The transmission T/M is one of well-known stepped transmissions without a torque converter, which have a plurality of (for example, five) gear positions for forward travel, one gear position for reverse travel, and a neutral position. An output shaft A3 of the T/M is connected, via a differential gear D/F, to drive wheels of the vehicle. The change of the gear position of the T/M can be carried out by controlling a transmission actuator AC/D2. By changing the gear position, a speed reduction ratio (ratio of an rpm Ni of the input shaft A2 to an rpm No of the output shaft A3) is adjusted.

The clutch C/D is a friction clutch disc which includes one of well-known configurations and is provided so as to integrally rotate with the input shaft A2 of the transmission T/M. More specifically, the clutch C/D (more precisely, clutch disc) is coaxially arranged so as to be opposed to the flywheel F/W provided so as to integrally rotate with the output shaft A1 of the engine E/G. The axial position of the clutch C/D (more precisely, clutch disc) with respect to the flywheel F/W is adjustable. The axial position of the clutch C/D is adjusted by a clutch actuator AC/D1.

Figure 2:
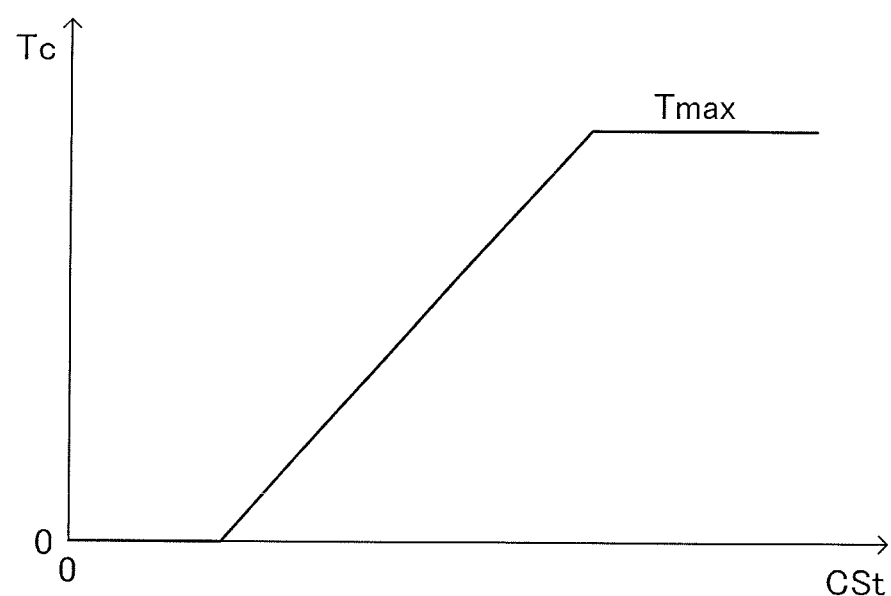
FIG. 2 A graph showing a map for defining a "stroke-torque characteristic" for a clutch illustrated in FIG. 1.

In the following description, a travel amount in the axial direction from an original position of the clutch C/D (a position at which the clutch disc is furthest from the flywheel) toward the engaging direction (pressed direction) is referred to as clutch stroke CSt. When the clutch C/D is at the "original position", the clutch stroke CSt is "0". As shown in FIG. 2, by adjusting the clutch stroke CSt, the maximum torque (clutch torque Tc), which can be transmitted by the clutch C/D, is adjusted. In a state in which "Tc=0", power is not transmitted between the output shaft A1 of the engine E/G and the input shaft A2 of the transmission T/M. This state is referred to as "disengaged state". Moreover, in a state in which "Tc>0", the power is transmitted between the output shaft A1 and the input shaft A2. This state is referred to as "engaged state".

The motor/generator M/G has one of well-known configurations (such as AC synchronous motor), and, for example, a rotor (not shown) is configured so as to integrally rotate with the output shaft of the M/G. The output shaft of the M/G is connected to the output shaft A3 of the T/M via a predetermined gear train. Specifically, the driving torque of the output shaft of the M/G is transmitted, without intermediation of the T/M, to the output shaft A3 of the T/M (namely, drive wheels). The driving torque of the output shaft of the M/G is controlled through the intermediation of an inverter INV with the use of the electric power supplied from a battery BAT.

This device also includes an accelerator opening sensor S1 for detecting an operated amount (accelerator opening) of an accelerator pedal AP, a shift position sensor S2 for detecting a position of a shift lever SF, and a brake sensor S3 for detecting absence/presence of an operation of a brake pedal BP.

Further, this device includes an electronic control unit ECU. The ECU, based on information from the above-mentioned sensors S1 to S3 and other sensors and the like, and other such information, controls the above-mentioned actuators AC/D1 and AC/D2, thereby controlling the clutch stroke CSt (thus, the clutch torque Tc) of the C/D and the gear position of the T/M. Yet further, the ECU controls a fuel injection amount of the E/G (opening of a throttle valve), thereby controlling the driving torque of the output shaft A1 of the E/G, and controls the inverter INV, thereby controlling the driving torque of the output shaft of the M/G. Still further, when the starter generator SM/G functions as a power generator, the ECU controls the inverter INV, thereby controlling the load torque applied by the starter generator SM/G to the output shaft A1 of the E/G.

As described above, this vehicle is "the hybrid vehicle with the AMT", which is equipped with the AMT and is provided with the configuration in which the output shaft of the M/G is connected to the output shaft A3 of the T/M. In the following description, for convenience of description, the driving torque generated on the output shaft A1 by the combustion of the E/G is referred to as "E/G torque Te". The load torque (torque in the deceleration direction) applied by the starter generator SM/G to the output shaft A1 of the E/G when the starter generator SM/G functions as the power generator is referred to as "SM/G load torque Ts". A net driving torque obtained by adding Te and Ts (negative value) is referred to as "E/G net driving torque Tne" (Tne=Te+Ts). A driving torque of the output shaft of the M/G is referred to as "M/G driving torque Tm". For simplification of the description, it is assumed herein that the torque in the deceleration direction due to a sliding resistance generated with the rotation of the output shaft of the E/G or the rotation of the output shaft of the M/G is zero.

Here, the E/G driving torque Te can be estimated based on, for example, a torque map created in advance having an opening of the throttle valve and a rpm of the E/G as arguments. The M/G driving torque Tm and the SM/G load torque Ts can be estimated based on a torque map created in advance having a value of a supplied current (or a value of a supplied voltage) or a frequency thereof as an argument.

In this device, when the shift lever SF is in a position corresponding to an "automatic mode", the gear position to be selected (selected gear position) is determined based on a gear change map stored in a ROM (not shown) included in the ECU and information from the sensors described above. When the shift lever SF is in a position corresponding to a "manual mode", the selected gear position is determined based on an operation of the shift lever SF performed by a driver. In the transmission T/M, the gear position is set to the selected gear position. When the selected gear position changes, the gear change action (action for changing the gear position) of the transmission T/M is carried out. The start of the gear change action corresponds to the start of movement of the members (specifically, the sleeves) moving in relation to the change in the gear position, and the end of the gear change action corresponds to the end of the movement of the members.

(Shift-Up Action)

As described above, this device is applied to the "hybrid vehicle with the AMT", which is equipped with the AMT and provided, with the configuration in which the output shaft of the M/G is connected to the output shaft A3 of the T/M. In the hybrid vehicle with the AMT, when the gear change action is to be carried out, the state of the clutch C/D is changed from an engaged state (clutch torque>0) to a disengaged state (clutch torque=0) before the start of the gear change action. Then, the gear change action is carried out while the clutch is maintained in the disengaged state. After the gear change action is finished, the state of the clutch is returned from the disengaged state to the engaged state.

Therefore, during the gear change action, the clutch C/D is maintained in the disengaged state. As a result, the E/G net driving torque Tne cannot be transmitted to the output shaft A3 of the transmission T/M. On the other hand, in the case of the hybrid vehicle with the AMT, the M/G driving torque Tm can be transmitted to the output shaft A3 of the transmission T/M (thus, to the drive wheels) even during the gear change action. In this manner, by using the assist of the M/G driving torque Tm, a gear change shock (generation of a valley in the driving torque) produced along with the gear change action can be suppressed.

In the following, the case where the shift-up action (gear change action for changing the gear position to a higher speed side) is carried out by using the assist of the M/G driving torque Tm when the vehicle travels using only the E/G net driving torque Tne (>0) (M/G driving torque Tm=0) is considered. First, referring to FIG. 3, an example of an action in the case where a comparative example of this device is adopted is described. Reference symbol NE denotes an rpm of the output shaft A1 of the E/G and reference symbol Ni denotes a rpm of the input shaft A2 of the T/M. As can be understood from FIG. 3, for simplification of the description, it is assumed in the comparative example that the SM/G load torque Ts is maintained to zero before and after the shift-up action and during the shift-up action. Specifically, it is assumed that Tne is maintained to a value equal to Te.

Figure 3:
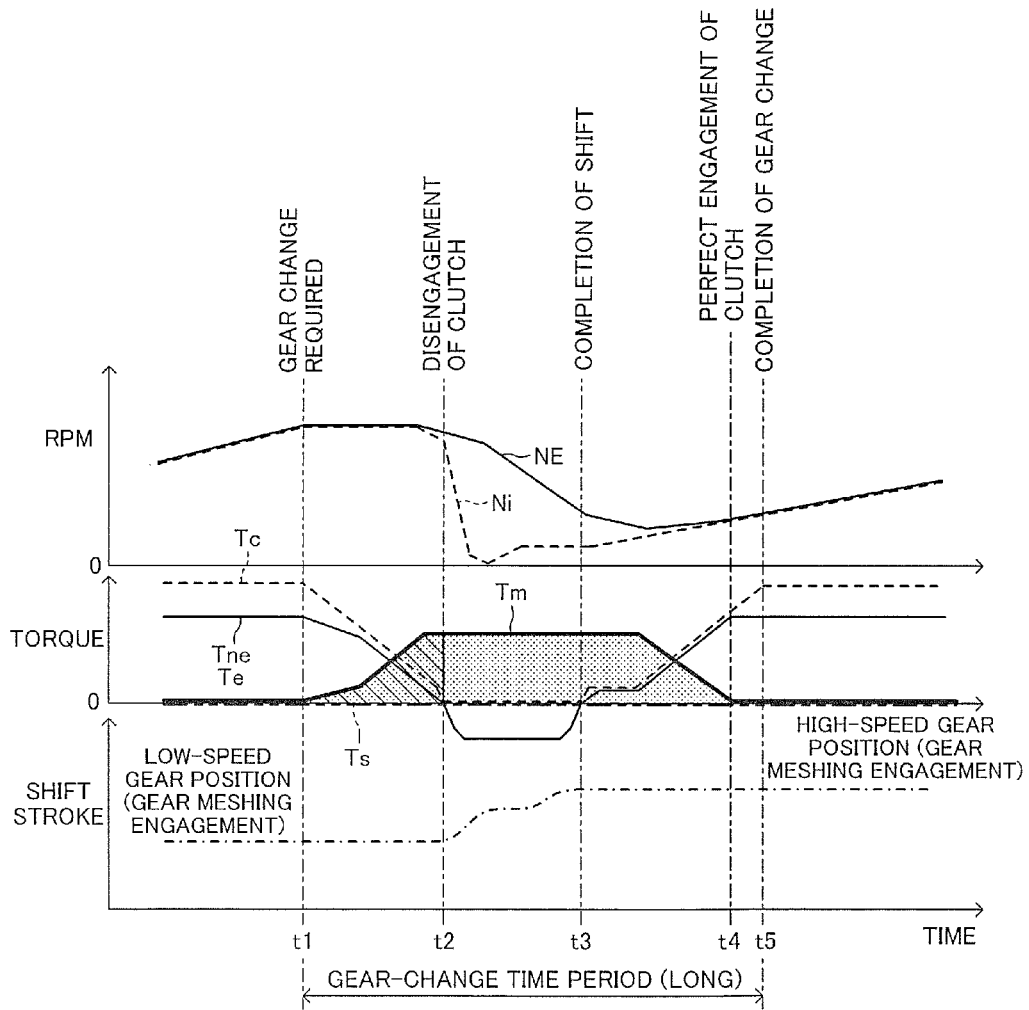
FIG. 3 A time chart showing an example of an action when a shift-up action is carried out by using the assist of an electric-motor driving torque, based on a comparative example of the embodiment of the present invention.

In the example illustrated in FIG. 3, before a time t1, the gear position of the transmission T/M is set to a certain low-speed gear position (for example, 2nd gear), the E/G net driving torque Tne and the M/G driving torque Tm are respectively adjusted to values (Tne>0, Tm=0) in accordance with a travel state, and the clutch torque Tc is maintained to a value (value larger than Tne) in accordance with the travel state. Specifically, before the time t1, the vehicle travels (accelerates) using only the E/G net driving torque Tne (>0) in a state in which the low-speed gear position is set.

At the time t1, a shift-up condition is satisfied. The shift-up condition is satisfied when the above-mentioned "selected gear position" changes from the current low-speed gear position to a higher speed gear position. When the shift-up condition is satisfied, the E/G net driving torque Tne and the clutch torque Tc are decreased, and the M/G driving torque Tm is increased from zero. By the increase of the M/G driving torque Tm from zero, the assist of the M/G driving torque Tm is started and carried out.

Here, the decrease of the E/G net driving torque Tne is achieved by decreasing the fuel injection amount of the E/G (opening of the throttle valve) to decrease the E/G driving torque Te. Moreover, Tc is decreased while maintaining a state in which Tc is larger than Tne so as not to cause a slide in the clutch C/D during the decrease of Tne and Tc.

At a time t2, the clutch torque Tc reaches zero (specifically, the clutch C/D is transitioned from the engaged state to the disengaged state). As a result, the E/G net driving torque Tne is not transmitted to the drive wheels. When the clutch torque Tc reaches zero, the shift-up action is started. In the shift-up action, the gear position of the transmission T/M is changed from the low-speed gear position (for example, 2nd gear) to the high-speed gear position (for example, 3rd gear). During the shift-up action, the clutch torque Tc is maintained to zero and a state in which the M/G driving torque Tm (>0) is transmitted to the drive wheels (specifically, a state in which the assist of the M/G driving torque Tm is used) is maintained.

At a time t3, the shift-up action is finished. When the shift-up action is finished, the E/G net driving torque Tne and the clutch torque Tc are increased, and the M/G driving torque Tm is decreased. Tc is increased while maintaining a state in which Tc is larger than Tne. By the increase of the clutch torque Tc from zero, the state of the clutch C/D is returned from the disengaged state to the engaged state. Immediately after the time t3, a difference occurs between the rpm NE of the output shaft A1 of the E/G and the rpm Ni of the input shaft A2 of the T/M. Specifically, a slide occurs in the clutch C/D (semi-engaged state).

At a time t4, the difference between NE and Ni disappears (specifically, the slide in the clutch C/D is eliminated) to bring the clutch C/D into a perfectly engaged state. At the same time, the values of the E/G net driving torque Tne and the M/G driving torque Tm are respectively returned to the values in accordance with the travel state (Tne>0, Tm=0). Then, at a time t5, the value of the clutch torque Tc is returned to the value in accordance with the travel state (value larger than Tne). In the following, a time period from the time t1 to the time t5 is referred to as "gear-change time period" in the example illustrated in FIG. 3.

As described above referring to FIG. 3, when the shift-up action is carried out using the assist of the M/G driving torque Tm, the electric power is consumed so as to temporarily increase the M/G driving torque Tm. The amount of power consumption corresponds to an area of a finely dotted region in FIG. 3. The power consumption is reduced as a time period in which the M/G driving torque Tm is increased (from the time t1 to the time t4 in FIG. 3) becomes shorter. Therefore, in view of the reduction in power consumption, it is preferred that the time period in which the M/G driving torque Tm is increased be as short as possible.

Attention is hereinafter focused on a time period from the time t1 to the time t2 (time period required for the clutch torque Tc to become zero after the satisfaction of the shift-up condition). The time period is referred to as "clutch-torque decrease time period". In order to shorten the clutch-torque decrease time period, it is necessary to advance timing at which the clutch torque becomes zero after the time t1. In order to advance the timing at which the clutch torque becomes zero, a gradient of decrease of the clutch torque Tc is required to be increased. In order to increase the gradient of decrease of the clutch torque Tc, a gradient of decrease of the E/G net driving torque Tne is required to be increased.

As described above, the gradient of decrease of the E/G net driving torque Tne can be adjusted by adjusting the fuel injection amount of the E/G to adjust the gradient of decrease of the E/G driving torque Te. Therefore, for example, by increasing the amount of reduction in the fuel injection amount after the time t1, the gradient of decrease of Te becomes larger. In this manner, the gradient of decrease of Tne can be increased. However, there is a limit to the range in which the gradient of decrease of the E/G driving torque Te can be adjusted by the fuel injection amount. Therefore, it is difficult to reduce the clutch-torque decrease time period to be sufficiently short. As a result, in the comparative example of this device (see FIG. 3), it is difficult to reduce the amount of power consumption (area of a hatched region in FIG. 3) due to the increase in the M/G driving torque Tm during the clutch-torque decrease time period to be sufficiently small.

Figure 4:
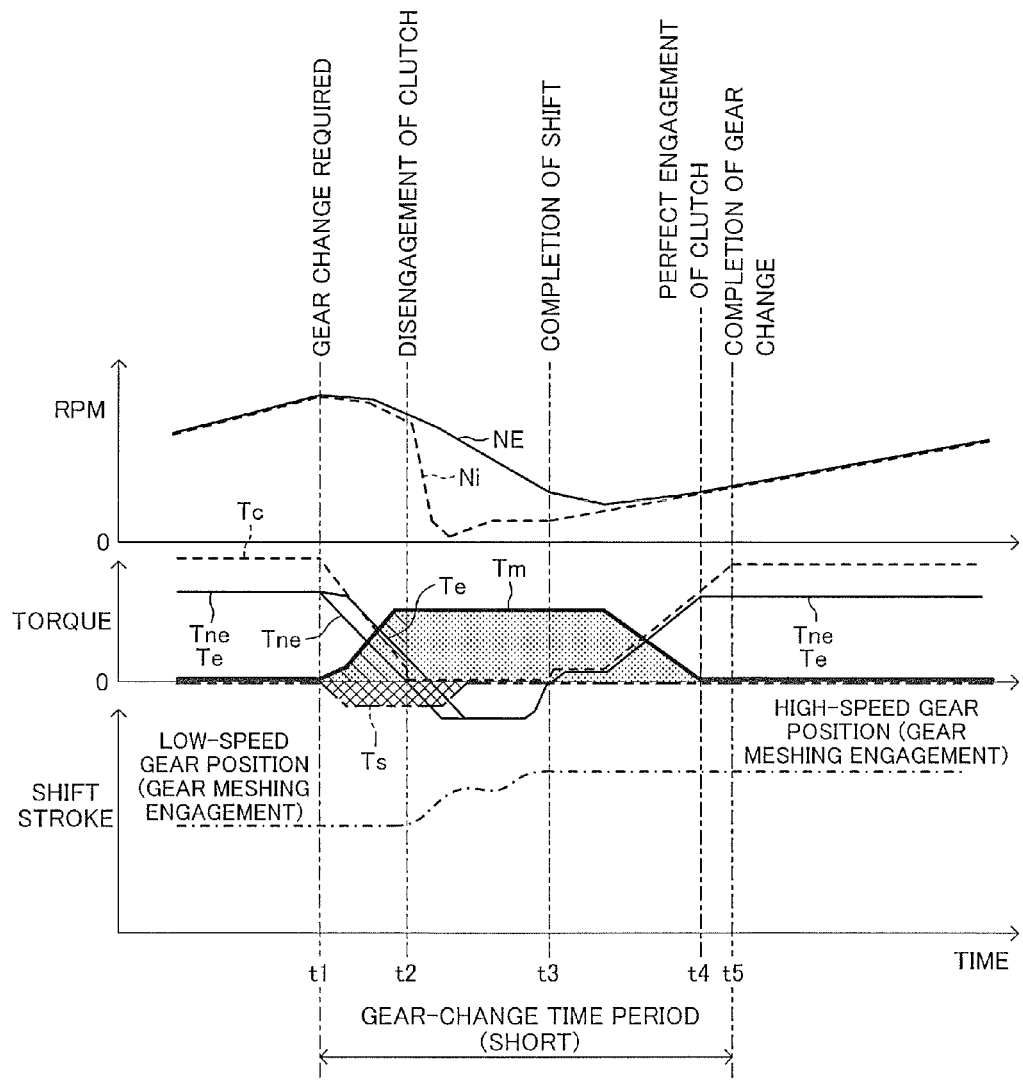
FIG. 4 A time chart corresponding to FIG. 3, which shows an example of the action when the shift-up action is carried out by using the assist of the electric-motor driving torque, based on the embodiment of the present invention.

On the other hand, FIG. 4 is a time chart corresponding to FIG. 3, which shows an example of the action when the shift-up action is carried out by this device, using the assist of the M/G driving torque Tm. Times t1 to t5 shown in FIG. 4 respectively correspond to the times t1 to t5 shown in FIG. 3. As can be understood from FIG. 4, in this device, during the clutch-torque decrease time period (from t1 to t2) and a predetermined time period following the clutch-torque decrease time period, the SM/G load torque Ts generated by the starter generator SM/G is adjusted to a value larger than a value measured before the start of the clutch-torque decrease time period (zero in this example). In FIG. 4, the value of Ts is indicated in the negative direction.

The SM/G load torque Ts generated by the starter generator SM/G acts in a direction of decreasing the E/G net driving torque Tne. Therefore, when the SM/G load torque Ts is increased during the clutch-torque decrease time period, the gradient of decrease of the E/G net driving torque Tne during the clutch-torque decrease time period can be increased as compared with the case where the SM/G load torque Ts is not increased. Thus, in this device (see FIG. 4), the gradient of decrease of the clutch torque Tc during the clutch-torque decrease time period can be increased as compared with the comparative example of this device (see FIG. 3). As a result, the timing (time t2), at which the clutch torque Tc becomes zero, can be advanced. In other words, the clutch-torque decrease time period (from t1 to t2) can be shortened, which in turn shortens the gear-change time period (from t1 to t5).

Thus, in this device (see FIG. 4), the amount of power consumption (area of a hatched region in FIG. 4) due to the increase in the M/G driving torque Tm during the clutch-torque decrease time period (from t1 to t2) can be reduced as compared with the comparative example of this device (see FIG. 3). As a result, the amount of power consumption (area of a finely dotted region in FIG. 4) due to the increase in the M/G driving torque Tm during the gear-change time period (from t1 to t5) can be reduced. As described above, in this device (see FIG. 4), the power consumption with the M/G driving when the shift-up action is carried out using the assist of the M/G driving torque Tm can be reduced as compared with the comparative example of this device (see FIG. 3).

In addition, in this device (see FIG. 4), by increasing the SM/G load torque Ts, the amount of power generated by the starter generator SM/G is increased. The electric power increased as described above can be efficiently used for various types of electric equipment mounted on the vehicle.

The present invention is not limited to the embodiment described above and various modifications can be adopted within the scope of the present invention. For example, in the embodiment described above, the load torque of the starter generator SM/G when the starter generator SM/G functions as the power generator is used as the load torque of the power generator which is rotationally driven by the output shaft A1 of the engine E/G. On the other hand, a load torque of an alternator ALT (see FIG. 1) mounted on the vehicle may be used as the load torque of the power generator which is rotationally driven by the output shaft A1 of the engine E/G.

Figure 5:
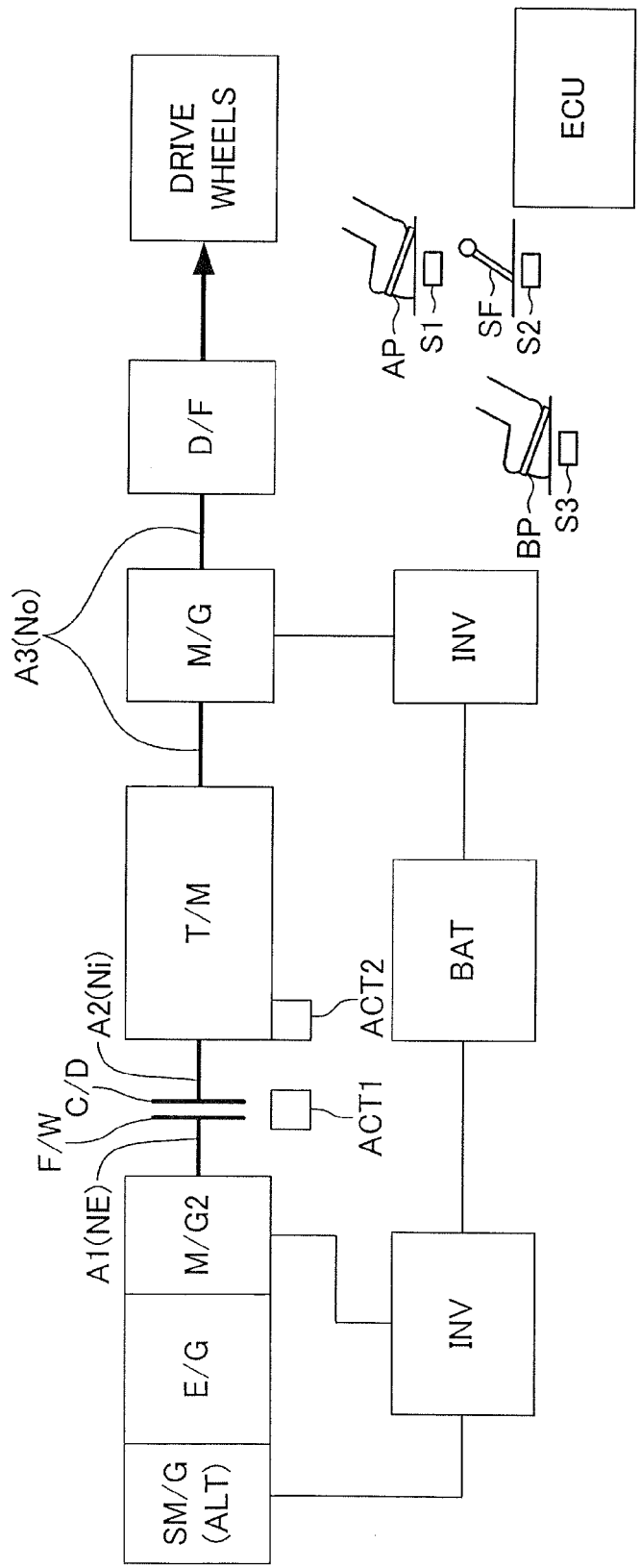
FIG. 5 A schematic configuration diagram of a vehicle equipped with a power transmission control device for a vehicle according to a modification of the embodiment of the present invention.

Alternatively, as illustrated in FIG. 5, when a second motor/generator M/G2 connected to the output shaft A1 of the engine E/G is mounted on the vehicle as a power source for the vehicle independently of the motor/generator M/G described above, a load torque of the second motor/generator M/G2 may be used. Alternatively, the load torques of two or more of the starter generator SM/G, the alternator ALT, and the second motor/generator M/G2 may be used.

Further, in the example of the action according to the embodiment described above (see FIG. 4), the shift-up action is carried out in the state in which the vehicle travels while only the E/G net driving torque Tne is transmitted to the drive wheels (see, before the time t1). However, even when the shift-up action is carried out in a state in which the vehicle travels while the E/G net driving torque Tne and the M/G driving torque Tm are both transmitted to the drive wheels under the condition in which the sum of Tne and Tm (Tne+Tm) does not exceed a "maximum value of Tm", the same functions and effects are provided.

In the example of the action according to the embodiment described above (see FIG. 4), the load torque of the starter generator SM/G is maintained to zero before the clutch-torque decrease time period (before the time t1). However, when the load torque of the starter generator SM/G is adjusted to a value larger than zero (value in the deceleration direction) before the clutch-torque decrease time period (before the time t1), the load torque of the starter generator SM/G is adjusted to a larger value (larger value in the negative direction in FIG. 4) during the clutch-torque decrease time period (from t1 to t2).

In the embodiment described above, the power transmission control device including the transmission having one input shaft and the single clutch connected to the one input shaft is used. A power transmission control device including a transmission having two input shafts and two clutches respectively connected to the two input shafts may be used. This device is also referred to as a double clutch transmission (DCT).

REFERENCE SIGNS LIST

T/M . . . transmission, E/G . . . engine, C/D . . . clutch, SM/G . . . starter generator, M/G . . . motor/generator, A1 . . . output shaft of engine, A2 . . . input shaft of transmission, A3 . . . output shaft of transmission, ACT1 . . . clutch actuator, ACT2 . . . transmission actuator, ECU . . . electronic control unit

The invention claimed is:

1. A power transmission control device for a vehicle, the vehicle including an internal combustion engine and an electric motor as power sources, the power transmission control device comprising:

a stepped transmission including an input shaft to which power is input from an output shaft of the internal combustion engine, the stepped transmission including an output shaft for outputting power to drive wheels of the vehicle, the stepped transmission having a plurality of predetermined gear positions each having different speed reduction ratios, each of the speed reduction ratios corresponding to a ratio of a rpm (rotations per minute) of the input shaft to a rpm of the output shaft, power being input from an output shaft of the electric motor to the output shaft of the stepped transmission without intermediation of the stepped transmission;

a clutch interposed between the output shaft of the internal combustion engine and the input shaft of the stepped transmission, the clutch being capable of adjusting a clutch torque corresponding to a maximum value of a torque which can be transmitted by the clutch; and a control portion configured to control 1) an internal combustion engine driving torque corresponding to a driving torque of the output shaft of the internal combustion engine, 2) an electric motor driving torque corresponding to a driving torque of the output shaft of the electric motor, 3) the clutch torque of the clutch, and 4) one of the plurality of gear positions of the stepped transmission, wherein the internal combustion engine driving torque, the electric motor driving torque, the clutch torque, and the one of the plurality of gear positions are controlled based on a travel state of the vehicle wherein the control portion is configured to decrease the internal combustion engine driving torque and the clutch torque and increase the electric motor driving torque based on satisfaction of a shift-up condition, and wherein the control portion is configured to decrease the internal combustion engine driving torque and the clutch torque and increase the electric motor driving torque in a state in which 1) the clutch torque is adjusted to a value larger than the internal combustion engine driving torque and 2) the vehicle is travelling while the internal combustion engine driving torque is transmitted to the drive wheels, wherein after the internal combustion engine driving torque and the clutch torque are decreased and the electric motor driving torque is increased, the control portion is configured to perform, based on a fact that the clutch torque becomes zero, a gear change action for changing the one of the plurality of gear positions of the stepped transmission from a current gear position to a high-speed side gear position while the clutch torque is maintained at zero and a state in which the electric motor driving torque is transmitted to the drive wheels is maintained, wherein the high-speed side gear position has a smaller speed reduction ratio than the current gear position, wherein after the gear change action is performed, the control portion is configured to increase the internal combustion engine driving torque and the clutch torque and decrease the electric motor driving torque based on a termination of the gear change action, and wherein the control portion is configured to adjust a load torque of a power generator provided to the vehicle to a value larger than a value of the load torque of the power generator measured before the satisfaction of the shift-up condition, during a time period from the satisfaction of the shift-up condition to a time at which the clutch torque becomes zero, and wherein the power generator is rotationally driven by the output shaft of the internal combustion engine.

2. The power transmission control device for the vehicle according to claim 1, wherein the control portion is configured to decrease the internal combustion engine driving torque and the clutch torque while a state in which the clutch torque is larger than the internal-combustion-engine driving torque is maintained, and during the time period from the satisfaction of the shift-up condition to the time at which the clutch torque becomes zero.

3. The power transmission control device for the vehicle according to claim 1, wherein the power generator comprises a starter motor/generator having a function of rotationally driving the output shaft of the internal combustion engine to start the internal combustion engine and a function of generating electric power based on the internal combustion engine driving torque.

4. The power transmission control device for the vehicle according to claim 1, wherein the power generator comprises an alternator having a function of generating electric power based on the internal combustion engine driving torque.

5. The power transmission control device for the vehicle according to claim 1, wherein the power generator comprises a second electric motor which is provided to the vehicle as a power source for the vehicle, and the second electric motor includes an output shaft from which power is input to the output shaft of the internal combustion engine.

* * * * *